(12) United States Patent
Seo et al.

(10) Patent No.: US 8,400,414 B2
(45) Date of Patent: Mar. 19, 2013

(54) METHOD FOR DISPLAYING DATA AND MOBILE TERMINAL THEREOF

(75) Inventors: Kyeonghye Seo, Seoul (KR); Junhee Kim, Seoul (KR); Sunjung Lee, Seoul (KR); Eunkyung Choi, Seoul (KR); Hyekyung Park, Seoul (KR); Kyunglack Kim, Seoul (KR); Jihye Yu, Seoul (KR)

(73) Assignee: LG Electronics Inc., Seoul (KR)

( * ) Notice: Subject to any disclaimer, the term of this patent is extended or adjusted under 35 U.S.C. 154(b) by 304 days.

(21) Appl. No.: 12/850,585

(22) Filed: Aug. 4, 2010

(65) Prior Publication Data

US 2011/0037714 A1     Feb. 17, 2011

(30) Foreign Application Priority Data

Aug. 11, 2009    (KR) .................... 10-2009-0073995

(51) Int. Cl.
  *G06F 3/041*    (2006.01)
  *G06F 3/12*    (2006.01)
  *H04W 4/00*    (2009.01)
(52) U.S. Cl. ............... 345/173; 178/18.01; 455/466; 715/702; 715/863; 715/864
(58) Field of Classification Search .................. 345/173; 178/18.01; 455/466; 715/702, 863, 864
See application file for complete search history.

(56) References Cited

U.S. PATENT DOCUMENTS

| | | | |
|---|---|---|---|
| 8,255,836 B1* | 8/2012 | Gildfind | 715/863 |
| 2004/0150668 A1* | 8/2004 | Myers et al. | 345/771 |
| 2007/0129046 A1* | 6/2007 | Soh et al. | 455/403 |
| 2009/0140997 A1* | 6/2009 | Jeong et al. | 345/173 |
| 2009/0228842 A1* | 9/2009 | Westerman et al. | 715/863 |
| 2011/0254791 A1* | 10/2011 | Wong et al. | 345/173 |

* cited by examiner

*Primary Examiner* — Ariel Balaoing
(74) *Attorney, Agent, or Firm* — Birch, Stewart, Kolasch & Birch, LLP

(57) ABSTRACT

A method for controlling a mobile terminal, and which includes displaying, via a display, a plurality of items on a touch screen of the mobile terminal; receiving, via a controller on the mobile terminal, a first touching signal indicating a first item of the plurality of items has been touched and held for a predetermined amount of time; displaying, via the display, a first preview screen corresponding to the selected first item when the first item has been touched and held for the predetermined amount of time; receiving, via the controller, a second touching signal indicating a flicking operation has been performed on the touch screen while the first touching signal is still being received; and displaying, via the display, a second preview screen of a next-priority item among the plurality of item instead of the first preview screen based on the received first and second touching signals.

18 Claims, 18 Drawing Sheets

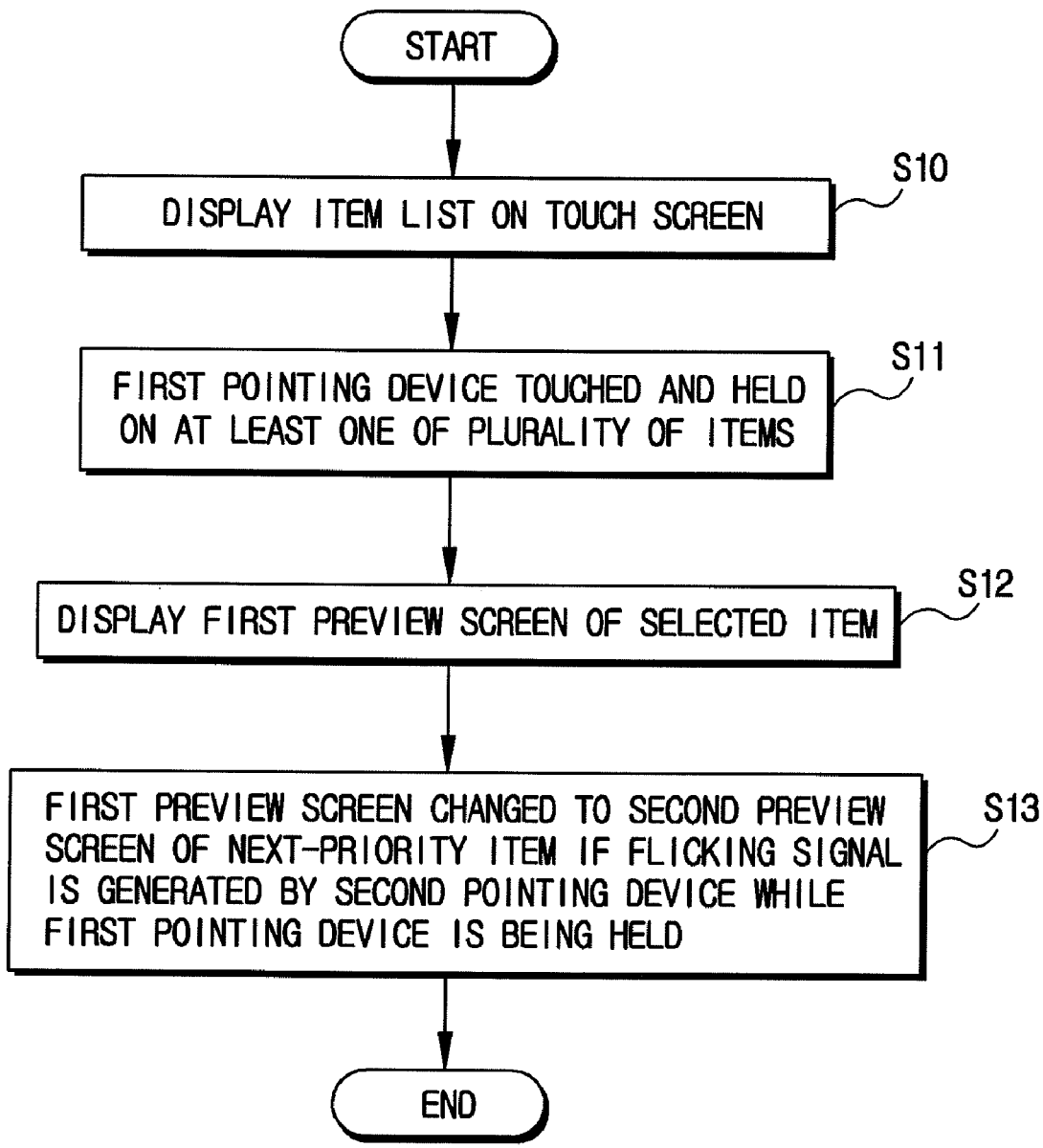

METHOD FOR DISPLAYING DATA AND MOBILE TERMINAL THEREOF

Pursuant to 35 U.S.C. §119 (a), this application claims the benefit of earlier filing date and right of priority to Korean Patent Application No. 10-2009-0073995, filed on Aug. 11, 2009, the contents of which are hereby incorporated by reference in their entirety.

BACKGROUND OF THE INVENTION

1. Field of the Invention

The present invention relates to a mobile terminal and corresponding method for displaying data.

2. Description of the Related Art

Generally, terminals can be classified into mobile/portable terminals and stationary terminals. The mobile terminals can be further classified into handheld terminals and vehicle mount terminals. In addition, mobile terminals now include many additional functions besides the basic call function. For example, mobile terminals include additional functions such as photographing of photos or moving pictures, playback of music or moving picture files, game playing, broadcast and Internet reception, etc. Thus, mobile terminals now operate as multimedia players.

However, because the mobile terminal is generally small in size, it is sometimes difficult to operate the variety of functions on the mobile terminal.

SUMMARY OF THE INVENTION

Accordingly, one object of the present invention is to address the above-noted and other problems.

Another object of the present invention is to provide a novel mobile terminal and corresponding method for displaying information based on a combination of touching and holding an item with a first pointing device and flicking the display with a second pointing device.

To achieve these and other advantages and in accordance with the purpose of the present invention, as embodied and broadly described herein, the present invention provides in one aspect a method for controlling a mobile terminal, and which includes displaying, via a display, a plurality of items on a touch screen of the mobile terminal; receiving, via a controller on the mobile terminal, a first touching signal indicating a first item of the plurality of items has been touched and held for a predetermined amount of time; displaying, via the display, a first preview screen corresponding to the selected first item when the first item has been touched and held for the predetermined amount of time; receiving, via the controller, a second touching signal indicating a flicking operation has been performed on the touch screen while the first touching signal is still being received; and displaying, via the display, a second preview screen of a next-priority item among the plurality of item instead of the first preview screen based on the received first and second touching signals. The present invention also provides a corresponding mobile terminal.

In another aspect, the present invention provides a method of controlling a mobile terminal, and which includes displaying, via a display, a plurality of items on a touch screen; selecting and highlighting a first item among the plurality of items upon receiving a selection signal generated by a first pointing device; moving and rearranging, via a controller on the mobile terminal, the plurality of items except for the first item upon receiving a predetermined rearranging signal generated by a second pointing device; and inserting, via the controller, the first item into a predetermined position among the rearranged plurality of items when a release signal is generated for the selected first item. The present invention also provides a corresponding mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 is a flowchart illustrating a method for displaying data according to an embodiment of the present invention;

DETAILED DESCRIPTION OF THE PREFERRED EMBODIMENTS

Reference will now be made in detail to the preferred embodiments of the present invention, examples of which are illustrated in the accompanying drawings.

Embodiments of the present invention may be applicable to various types of mobile terminals such as mobile phones, user equipment, smart phones, DTV, computers, digital broadcast terminals, personal digital assistants, portable multimedia players (PMP) and/or navigators. In some instances, the embodiments may be applicable to stationary terminals such as TVs, computers, etc. The following description refers to a mobile but such teaching apply equally to other types of terminals such as stationary terminals that include digital TVs and desktop computers.

Figure 1:
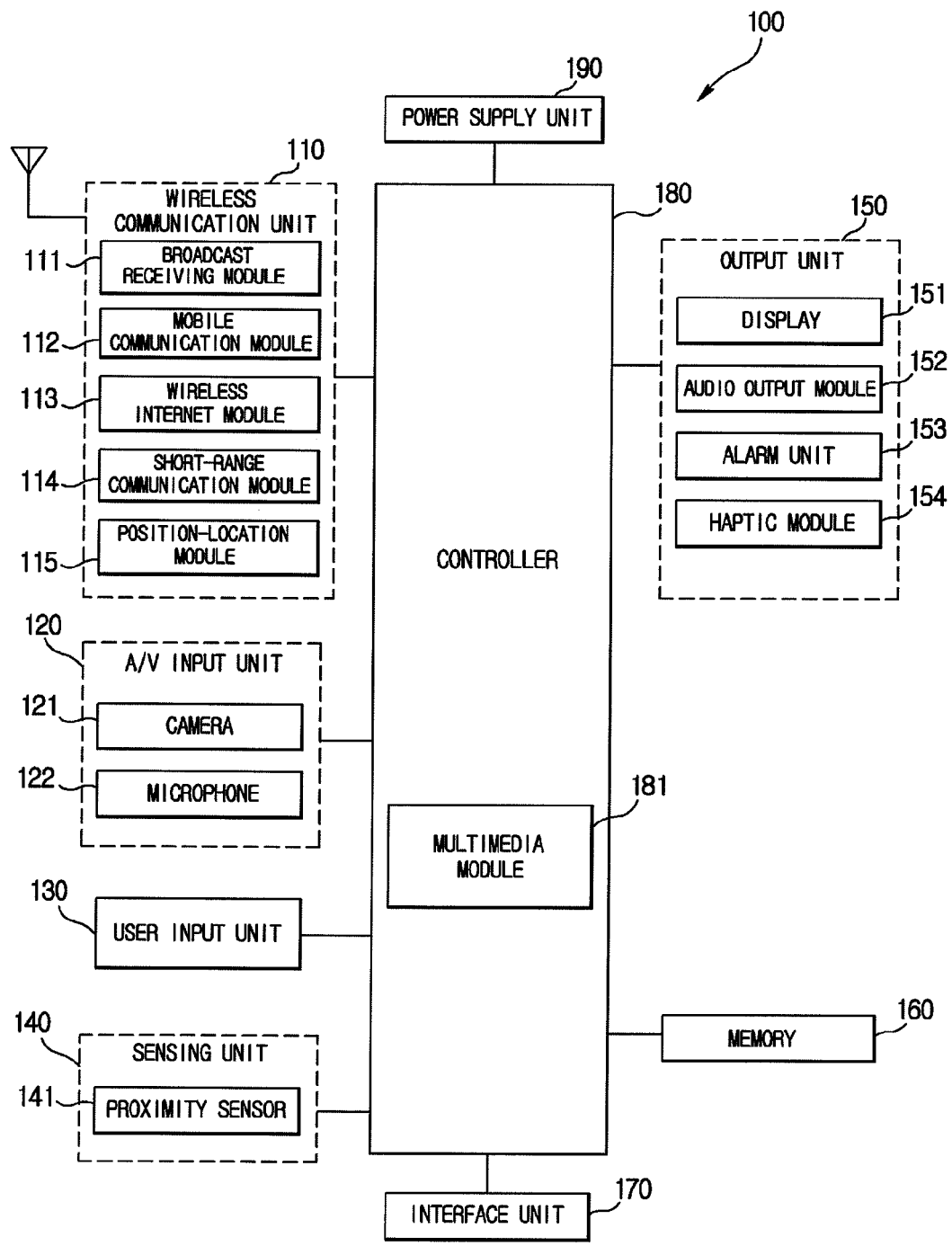
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 are essential parts and the number of components included in the mobile terminal can be varied.

In addition, the radio communication unit 110 includes at least one module that enables radio communication between the mobile terminal 100 and a radio communication system or between the mobile terminal 100 and a network in which the mobile terminal 100 is located. For example, in FIG. 1, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Further, the broadcasting channel can include a satellite channel and a terrestrial channel. Also, the broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals, but also signals in the form of a combination of a TV broadcasting signal and a radio broadcasting signal.

In addition, the broadcasting related information can be information on a broadcasting channel, a broadcasting program or a broadcasting service provider. The broadcasting related information can be provided even through a mobile communication network. In this instance, the broadcasting related information can be received by the mobile communication module 112. The broadcasting related information can also exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. In particular, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, and the DVB-H and integrated services digital broadcast-terrestrial (ISDB-T) system. The broadcasting receiving module 111 can also be constructed to be suited to broadcasting systems providing broadcasting signals other than the above-described digital broadcasting systems. The broadcasting signals and/or broadcasting related information received through the broadcasting receiving module 111 can also be stored in the memory 160.

Further, the mobile communication module 112 transmits/receives a radio signal to/from at least one of a base station, an external terminal, and a server on a mobile communication network. The radio signal can include a voice call signal, a video telephony call signal or data in various forms according to transmission and receiving of text/multimedia messages. The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique. The local area communication module 114 corresponds to a module for local area communication. Bluetooth, radio frequency identification (RFID), infrared data association (IrDA), ultra wideband (UWB) and ZigBee can be used as a local area communication technique.

In addition, the position information module 115 confirms or obtains the position of the mobile terminal 100. A global positioning system (GPS) module is a representative example of the position information module 115. Further, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude coordinates at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. The processed image frames can be displayed on a display 151 included in the output unit 150. In addition, the image frames processed by the camera 121 can be stored in the memory 160 or transmitted to an external device through the radio communication unit 110. The mobile terminal 100 can also include at least two cameras according to constitution of the terminal.

Further, the microphone 122 receives an external audio signal in a call mode, a recording mode or a speed recognition mode and processes the received audio signal into electric audio data. The audio data can also be converted into a form that can be transmitted to a mobile communication base station through the mobile communication module 112 and output in the call mode. The microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on. The sensing unit 140 senses the current state of the mobile terminal 100, such as an open/close state of the mobile terminal 100, the position of the mobile terminal 100, whether a user touches the mobile terminal 100, the direction of the mobile terminal 100 and acceleration/deceleration of the mobile terminal 100 and generates a detection signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor 141.

In addition, the output unit 150 generates visual, auditory or tactile output and in FIG. 1 includes the display 151, an audio output module 152, an alarm 153, and a haptic module 154. The display 151 displays information processed by the mobile terminal 100. For example, the display 151 displays a UI or graphic user interface (GUI) related to a telephone call when the mobile terminal is in the call mode. The display 151 also displays a captured or/and received image, UI or GUI when the mobile terminal 100 is in the video telephony mode or the photographing mode.

The display 151 can also include at least one of a liquid crystal display, a thin film transistor liquid crystal display, an organic light-emitting diode display, a flexible display and a three-dimensional display. Some of these displays can be of a transparent type or a light transmission type, which is referred to as a transparent display. The transparent display also includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display 151.

Further, the mobile terminal 100 can include at least two displays 151 according to constitution of the terminal. For example, the mobile terminal 100 can include a plurality of displays that are arranged on a single face at a predetermined distance or integrated. Otherwise, the plurality of displays can be arranged on different sides. In addition, when the display 151 and a sensor sensing touch (referred to as a touch sensor hereinafter) form a layered structure, which is referred to as a touch screen hereinafter, the display 151 can be used as an input device in addition to an output device. The touch sensor can be in the form of a touch film, a touch sheet and a touch pad, for example.

Also, the touch sensor can be constructed such that it converts a variation in pressure applied to a specific portion of the display 151 or a variation in capacitance generated at a specific portion of the display 151 into an electric input signal. The touch sensor can also be constructed such that it can sense pressure of touch as well as the position and area of touch. When touch input is applied to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal 100, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 has a lifetime longer than that of a contact sensor and has wide application. The proximity sensor 141 also includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

In addition, a capacitive touch screen is constructed such that a proximity of a pointer is detected through a variation in an electric field according to the proximity of the pointer. In this instance, the touch screen (touch sensor) can be classified as a proximity sensor. For convenience of explanation, an action of approaching the pointer to the touch screen while the pointer is not in contact with the touch screen such that the location of the pointer on the touch screen is recognized is referred to as a "proximity touch" and an action of bringing the pointer into contact with the touch screen is referred to as a "contact touch" in the following description. Also, a proximity touch point of the pointer on the touch screen means a point of the touch screen to which the pointer corresponds perpendicularly to the touch screen when the pointer proximity-touches the touch screen.

Further, the proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can also be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. The audio output module 152 also outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating a generation of an event of the mobile terminal 100. Examples of events generated in the mobile terminal 100 include receiving a call signal, receiving a message, inputting a key signal, inputting touch, etc. The alarm 153 can also output signals in forms different from video signals or audio signals, for example, a signal for indicating a generation of an event through vibration. The video signals or the audio signals can also be output through the display unit 151 or the audio output module 152.

In addition, the haptic module 154 generates various haptic effects that the user can feel. A representative example of the haptic effects is vibration. The intensity and pattern of vibration generated by the haptic module 154 can also be controlled. For example, different vibrations can be combined and output or sequentially output. The haptic module 154 can also generate a variety of haptic effects including an effect of stimulus according to an arrangement of pins vertically moving for a contact skin face, an effect of stimulus according to a jet force or sucking force of air through a jet hole or a sucking hole, an effect of stimulus of rubbing the skin, an effect of stimulus according to contact of an electrode, an effect of stimulus using an electrostatic force and an effect according to reproduction of cold and warmth using an element capable of absorbing or radiating heat in addition to vibrations. Further, the haptic module 154 can not only transmit haptic effects through direct contact but also allow the user to feel haptic effects through kinesthetic sense of his or her fingers or arms. The mobile terminal 100 can also include at least two or more haptic modules 154 according to constitution of the mobile terminal.

In addition, the memory 160 stores a program for the operation of the controller 180 and temporarily stores input/output data (for example, phone book, messages, still images, moving images, etc.). The memory 160 can also store data about vibrations and sounds in various patterns, which are output when a touch input is applied to the touch screen. The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

Further, the interface 170 serves as a path to all external devices connected to the mobile terminal 100. The interface 170 receives data or power from the external devices and transmits the data or power to the internal components of the mobile terminal 100 or transmits data of the mobile terminal 100 to the external devices. The interface 170 can also include a wired/wireless headset port, an external charger port, a wired/wireless data port, a memory card port, a port for connecting a device having a user identification module, an audio I/O port, a video I/O port, an earphone port, etc., for example.

In addition, an identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

Also, the interface 170 can serve as a path through which power from an external cradle is provided to the mobile terminal 100 when the mobile terminal 100 is connected to the external cradle or a path through which various command signals input by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. In FIG. 1, the controller 180 includes a multimedia module 181 for playing multimedia. The multimedia module 181 can be included in the controller 180 or separated from the controller 180. Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Further, various embodiments of the present invention can be implemented in a computer or similar device readable recording medium using software, hardware or a combination thereof, for example. According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. The embodiments can also be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
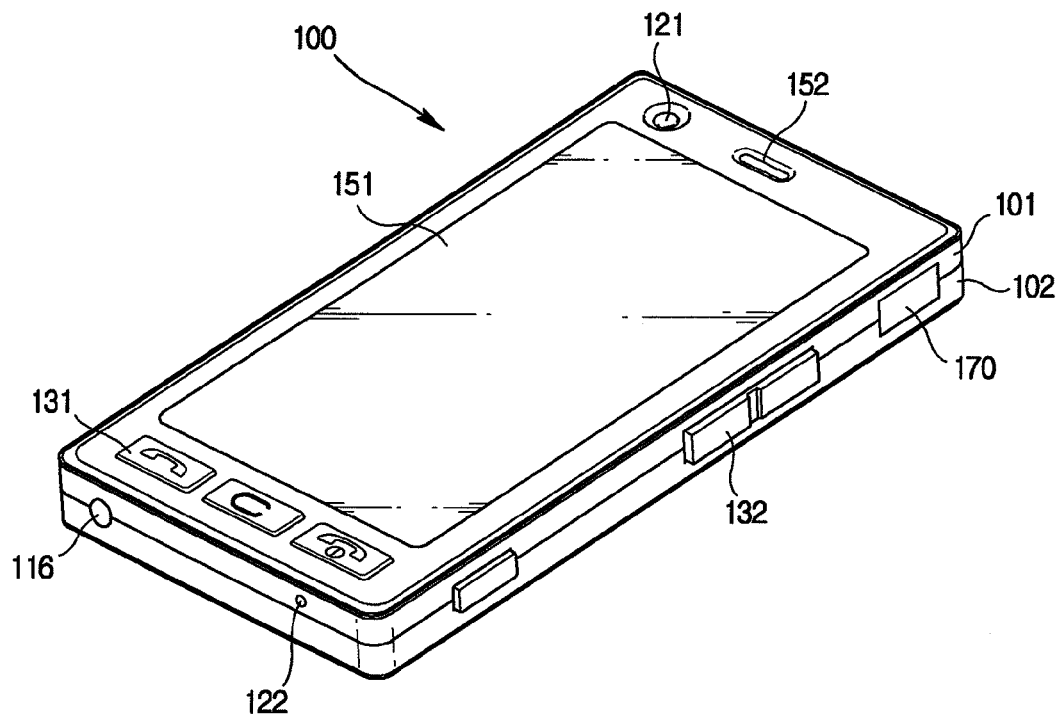
FIG. 2A is a front-view of a mobile terminal according to an embodiment of the present invention.

Next, FIG. 2A is a front perspective view of a mobile terminal or a handheld terminal 100 according to an embodiment of the present invention. As shown, the mobile terminal 100 is a bar type terminal body. However, the present invention is not limited to a bar type terminal and can be applied to terminals of various types including a slide type, folder type, swing type and swivel type terminals having at least two bodies that are relatively movably combined.

In addition, the terminal body includes a case (a casing, a housing, a cover, etc.) forming the exterior of the terminal 100. In the present embodiment, the case is divided into a front case 101 and a rear case 102. Various electronic components are also arranged in the space formed between the front case 101 and the rear case 102. At least one middle case can be additionally arranged between the front case 101 and the rear case 102. The cases can also be formed of plastics through injection molding or be made of a metal material such as stainless steel (STS) or titanium (Ti).

In addition, the display 151, the audio output unit 152, the camera 121, user input units 131 and 132 of the user input unit 130 (FIG. 1), the microphone 122 and the interface 170 are arranged in the terminal body, specifically, in the front case 101. Also, the display 151 occupies most part of the main face of the front case 101. The audio output unit 152 and the camera 121 are arranged in a region in proximity to one of both ends of the display 151 and the user input unit 131 and the microphone 122 are located in a region in proximity to the other end of the display 151. In addition, the user input unit 132 and the interface 170 are arranged on the sides of the front case 101 and the rear case 102.

Further, the user input unit 130 is operated to receive commands for controlling the operation of the handheld terminal 100 and can include the operating units 131 and 132. The operating units 131 and 132 can be referred to as manipulating portions and employ any tactile manner in which a user operates the operating units 131 and 132 while having tactile feeling. The operating units 131 and 132 can also receive various inputs. For example, the operating unit 131 receives commands such as start, end and scroll, and the second operating unit 132 receives commands such as control of the volume of sound output from the audio output unit 152 or conversion of the display 151 to a touch recognition mode.

Figure 2B:
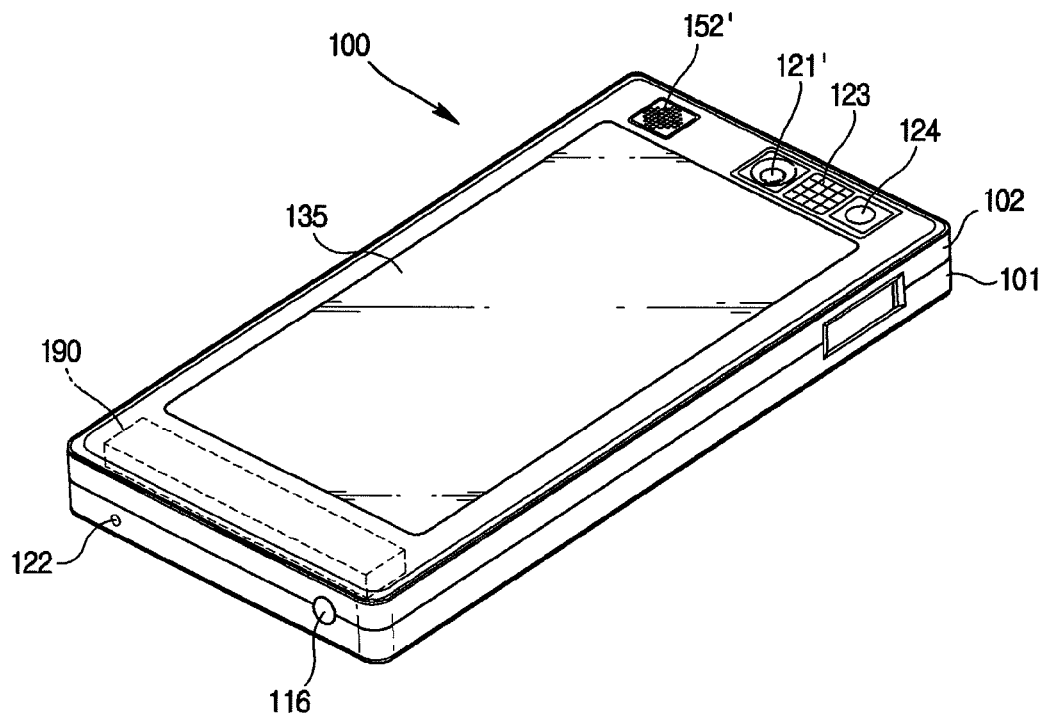
FIG. 2B is a perspective diagram of a backside of the mobile terminal shown in FIG. 2A.

Next, FIG. 2B is a rear perspective view of the mobile terminal 100 shown in FIG. 2A according to an embodiment of the present invention. Referring to FIG. 2B, a camera 121' is additionally attached to the rear side of the terminal body, that is, the rear case 102. The camera 121' has a photographing direction opposite to that of the camera 121 shown in FIG. 2A and can have pixels different from those of the camera 121 shown in FIG. 2A. For example, it is preferable that the camera 121 has low pixels such that it can capture an image of the face of a user and transmit the image to a receiving part for video telephony, while the camera 121' has high pixels because it captures an image of a general object and does not immediately transmit the image in many instances. The cameras 121 and 121' can also be attached to the terminal body such that they can be rotated or pop-up.

A flash bulb 123 and a mirror 124 are also arranged in proximity to the camera 121'. The flash bulb 123 lights an object when the camera 121' takes a picture of the object, and the mirror 124 is used for the user to look at his/her face in the mirror when the user wants to self-photograph himself/herself using the camera 121'. An audio output unit 152' is also provided on the rear side of the terminal body. The audio output unit 152' can thus achieve a stereo function with the audio output unit 152 shown in FIG. 2A and be used for a speaker phone mode when the terminal is used for a telephone call.

A broadcasting signal receiving antenna 124 is also attached to the side of the terminal body in addition to an antenna for telephone calls. The antenna 124 constructing a part of the broadcasting receiving module 111 shown in FIG. 1 can be set in the terminal body such that the antenna 124 can be retracted from the terminal body. Further, the power supply 190 for providing power to the handheld terminal 100 is set in the terminal body. The power supply 190 can be included in the terminal body or detachably attached to the terminal body. A touch pad 135 for sensing touch is also attached to the rear case 102. The touch pad 135 can be of a light transmission type as the display 151. In this instance, if the display 151 outputs visual information through both sides thereof, the visual information can be recognized through the touch pad 135. The information output through both sides of the display 151 can also be controlled by the touch pad 135. Otherwise, a display is additionally attached to the touch pad 135 such that a touch screen can be arranged even in the rear case 102.

The touch pad 135 also operates in connection with the display 151 of the front case 101. The touch pad 135 can be located in parallel with the display 151 behind the display 151, and can be identical to or smaller than the display 151 in size. Interoperations of the display 151 and the touch pad 135 will now be described with reference to FIGS. 3A and 3B. In addition, the following embodiments will be described with the display 151 including a touch screen, and thus the touch screen will be referred to as touch screen 151.

Next, FIG. 3 is a flowchart illustrating a method for displaying data according to an embodiment of the present invention. As shown, the controller 180 display an item list including a plurality of items on a touch screen 151 in response to a user's selection (S10). When the user touches and holds at least one of the plurality of items using a first pointing device (S11), the controller 180 displays a first preview screen of a selected item on the touch screen 151 (S12). In addition, the pointing device may include all devices such as a finger and a stylus capable of generating an input signal by touching the touch screen.

Figure 4:
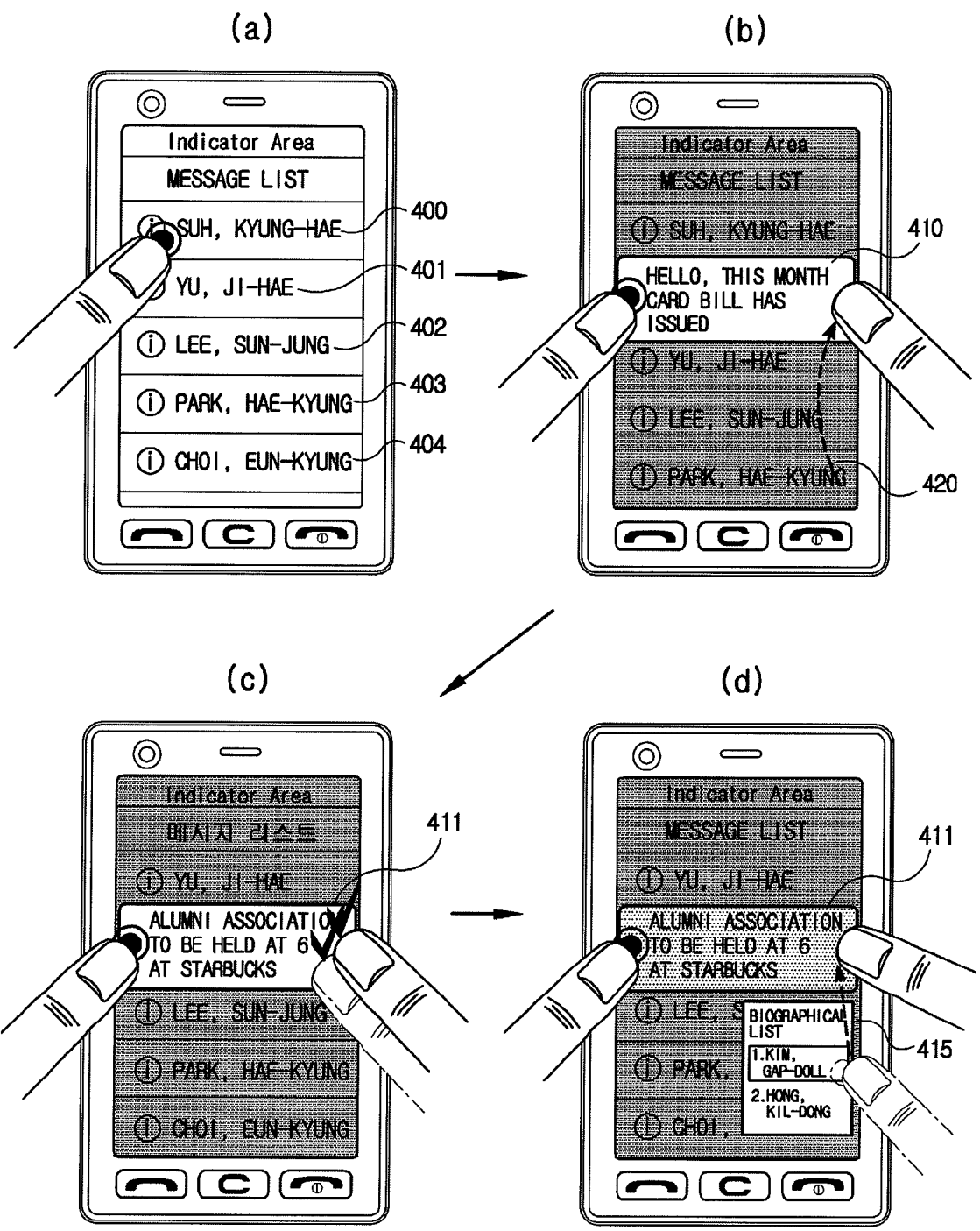
FIG. 4 is an overview of display screens illustrating a method for displaying data according to a first embodiment of the present invention.

Further, the controller 180 then changes the first preview screen to a second preview screen of a next-priority item if a flicking signal is generated by the second pointing device while the first pointing device is being held (S13). In more detail, FIG. 4 is an overview of display screens illustrating a method for displaying data according to a first embodiment of the present invention. As shown in FIG. 4(*a*), the controller 180 displays an item list (e.g., 'a text message list' in this embodiment) including a plurality of items 400-404 on the touch screen 151 in response to a user's selection. Also, as shown in FIG. 4(*a*), the user touches and holds at least one of the plurality of items using a first pointing device (e.g., 'a left finger'). In FIG. 4(*a*), the user touches the item 400.

Then, as shown in FIG. 4(*b*), the controller 180 displays a message identifying window 410 (first preview screen) for the selected item 400 on the touch screen 151. Then, the user can use their right finger (second pointing device) to generate a flicking signal while maintaining or holding their left finger (first pointing device). Then, as shown in FIG. 4(*c*), the controller 180 changes the first preview screen 410 to a second preview screen 411 for a next-priority item 401 and displays the same on the touch screen 151.

Further, the next-priority item may be set by the user or set as a default value. For example, the next-priority item can be set as an item positioned underneath the currently selected item, or set as an item above the currently selected item. Alternatively, the next-priority item can be set based on the direction of the flicking signal. For instance, the next-priority item can be set as an item above the currently selected item, when the flicking signal is directed upwards. Conversely, the next-priority item can be set as an item underneath the currently selected item, when the flicking signal is directed downwards. The controller 180 can also display preview screens of the next-priority items 402, 403, 404 on the touch screen 151 when the user continuously generates the flicking signals.

Also, as shown in FIG. 4(*d*), the user can use their right finger (the second pointing device) to multi-touch the second preview screen 411. In this instance, the controller 180 generates a biographical list display. In addition, the biographical list display signal can be generated by various other methods (e.g., a long touch operation with the right finger, etc.). In addition, as shown in FIG. 4(*d*), the biographical list may be a phone book list stored in the memory 160. That is, in the embodiment in FIG. 4(*d*), the controller 180 extracts a biographical list from the memory 160 and displays a biographical list menu 415 on the touch screen 151. At this time, the controller 180 can also display the second preview screen 411 in a dimmer color than before.

Next, the user can use the second pointing device (e.g., the 'right finger') to touch and drop one item ('Kim, Gap-Dong icon') in the biographical list. The controller 180 then drives the wireless communication unit 110 and transmits contents included in the second preview screen 411 to a mobile terminal corresponding to the selected biographical item ('Kim, Gap-Dong'). The user can also select a plurality of names from the biographical list and transmit the contents included in the second preview screen 411 to mobile terminals corresponding to the plurality of names.

Furthermore, the user may use methods other than the touch and drop method to select one of the names from the biographical list. For example, the user may successively input a detail view screen display signal for viewing the displayed preview screen. In more detail, the detail view screen display signal may be generated when the first pointing device is separated from the touch screen (i.e., a proximity touch). The user may also generate the detail view screen display signal using various other methods.

Further, when the detail view screen display signal is input, the controller 180 can change the second preview screen 411 into a full screen and display the same on the touch screen 151. The full screen may contain text message contents, a response icon and a deletion icon included in the second preview screen 411. When the user selects the response icon, the controller 180 can display a message window the user can use to input response contents and a phone number input window including the phone number of a mobile terminal corresponding to the selected item 401. Using these windows, the user can transmit a response text message to the mobile terminal corresponding to the selected item 401. In addition, when a deleted icon is selected, the controller 180 can delete the text message displayed on the full screen, whereby the user can conveniently change the text message contents displayed on the touch screen 151.

Thus, in the embodiment shown in FIG. 4, the user touches and hold a first item 401 using a first finger, and the controller 180 displays a first preview window 410 including information concerning the first item 401 (e.g., details of the text message). The user can then flick the screen using a second finger. Note, the user can use two fingers on one hand (e.g., a left and right finger) or can use two fingers on different hands (e.g. the left and right thumbs while the user is holding the mobile terminal). Then, the controller 180 displays a preview screen for a next highest priority item as shown in FIG. 4(*c*)

Note that in FIG. 4(*c*), the controller 180 displays a preview screen 411 for the item 401, which is the next priority item in the list of items 400-404 in this example. Thus, the user can scroll down and preview parts of the messages for each of the items 400-404. In addition, the next priority item was designated as item 401, but the next priority item can be set by the user to be any designated category. For example, the user can designate messages from their wife as being a higher priority than messages received from a friend. In this example, user can view partial messages from their wife before their friend.

Next, the user can perform a double click operation on a displayed preview screen as shown in FIG. 4(c), and the controller 180 then displays a biographical list as shown in FIG. 4(d). In this embodiment, the biographical list is a phonebook list the user has stored on their mobile terminal. The user can then touch and drop or touch, drag and drop a contact from the phonebook list into the preview screen of the selected item. The controller 180 then transmits the message corresponding to the preview screen to the selected contact.

In another example, the biographical list can include phone numbers or contacts related to the particular text message being previewed. In more detail, the controller 180 can determine the phone numbers related to all people included in a text message and display the phone numbers so the user can easily call one of the numbers listed. If the message is an email message, the controller 180 can review a table stored in the memory 160 that maps email addresses with phone numbers, and then extract the correct phone number. This is particular advantageous when an email or text message is sent to two or more users regarding an upcoming social event, for example. Thus, the user could easily call one of the persons included in the email using a convenient touch, flick and double click operation, for example.

Figure 5:
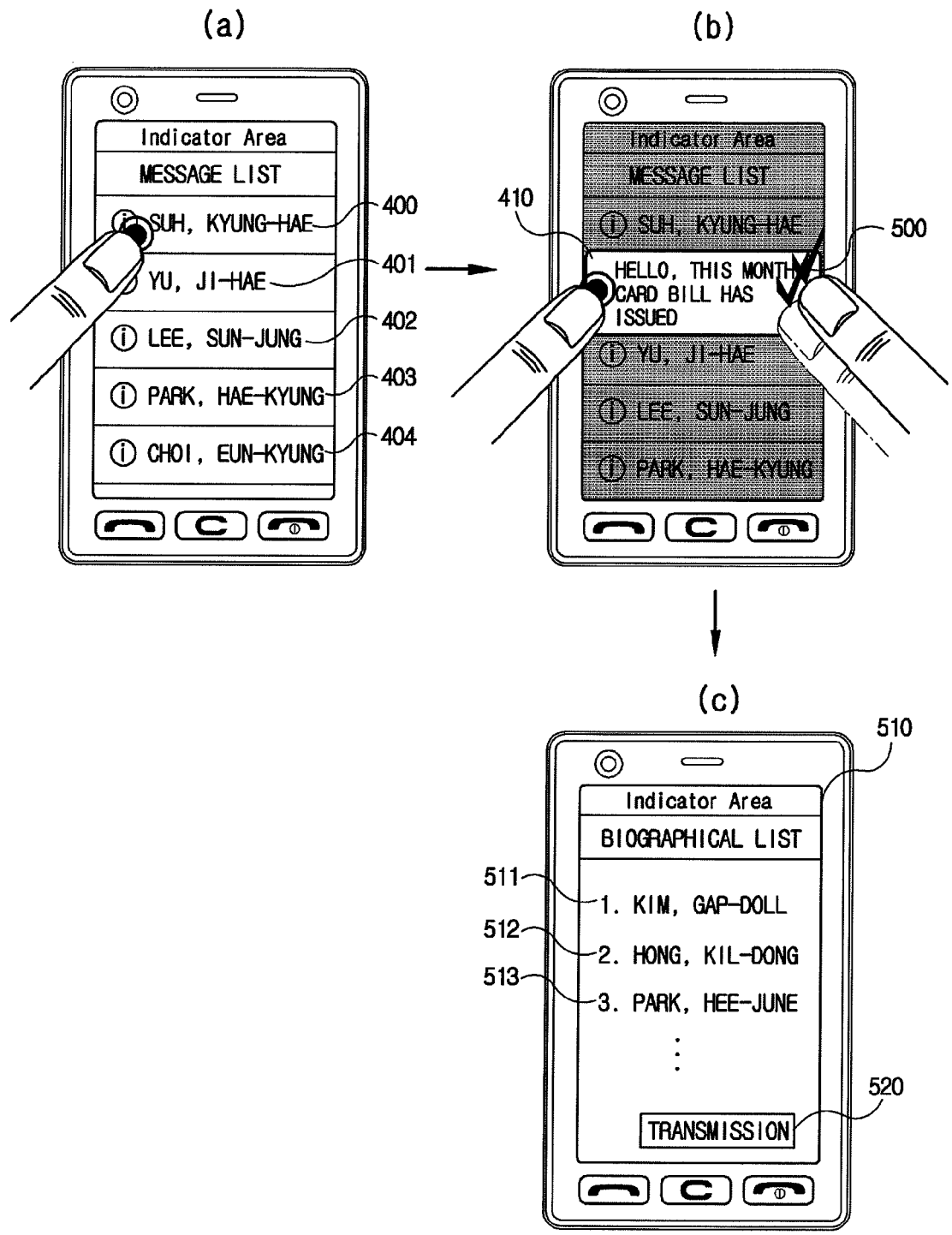
FIG. 5 is an overview of display screens illustrating a method for displaying data according to a second embodiment of the present invention.

Next, FIG. 5 is an overview of display screens illustrating a method for displaying data according to a second embodiment of the present invention. Note that FIGS. 5(a) and 5(b) are similar to FIGS. 4(a) and 4(b). For example, the controller 180 first displays an item list ('a text message list') including the plurality of items 400-404 on the touch screen 151. The user then touches and holds at least one item 400 of the plurality of items using a first pointing device ('a left finger') as shown in FIG. 5(a). Then, the controller 180 displays the first preview screen 410 (e.g., a message identifying window) of the selected item 400 on the touch screen 151 as shown in FIG. 5(b).

The user then uses the second pointing device (e.g., the 'right finger') to generate a biographical list display signal 500 by multiple-touching the first preview screen 410 while the first pointing device is being held. As discussed above, the biographical list may be a phone book list stored in the memory 160 of the mobile terminal 100. Then, the controller 180 displays a biographical list screen 510 on the touch screen 151 as shown in FIG. 5(c). The list screen 510 may contain biographical items 511-513 and a transfer icon 520. The user can then select a contact 511-513 and a transfer/transmission icon 520. The controller 180 then drives the wireless communication unit 110 and transmits the contents included in the preview screen 410 to a mobile terminal corresponding to the selected biographical items, whereby the user can conveniently transmit the confirmed contents to another terminal using the preview screen. The additional embodiments in FIG. 4 can also be applied to the embodiments in FIG. 5.

Figure 6A:
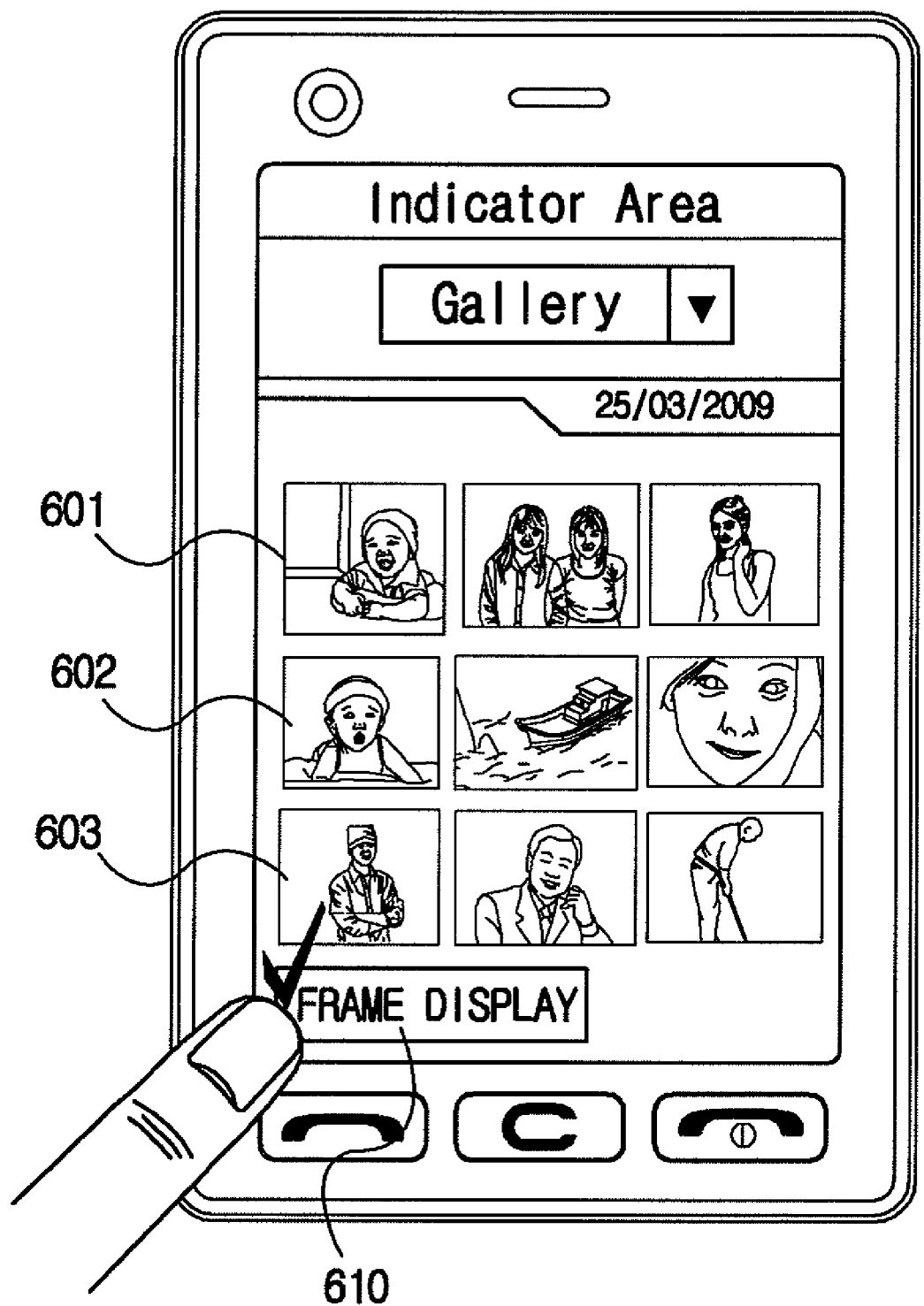
FIGS. 6A-6E are overviews of display screens illustrating a method for displaying data according to a third embodiment of the present invention.
Figure 6B:
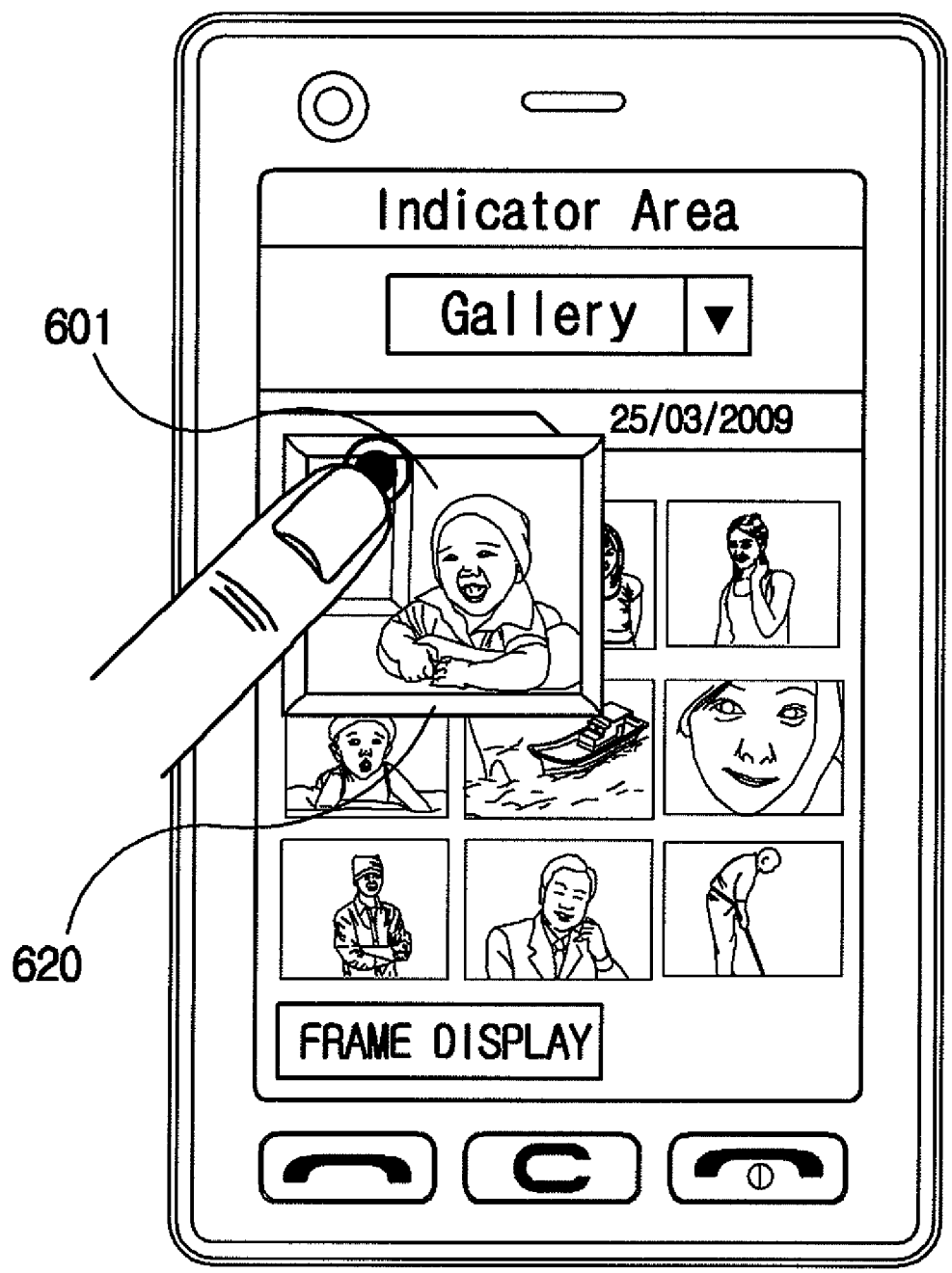

Next, FIGS. 6A-6E are overviews of display screens illustrating a method for displaying data according to a third embodiment of the present invention. In this embodiment, and as shown in FIG. 6A, the controller 180 extracts a plurality of images 601-604 from the memory 160 and displays the images on the touch screen 151 in the form of thumbnails. The user then selects a frame display icon 610 and the controller 180 displays a frame 620 including an inserted preview image 601 in the frame 620 as shown in FIG. 6B. In addition, the user can select the frame display icon 610 by touching the icon 610, by selecting an exclusive key or an exclusive icon, by inputting a voice instruction, by a proximity touch action, by shaking the terminal 100, etc.

Further, the preview image 601 inserted in the image frame 620 can be the first image displayed, an image selected by a user, a random image among the images displayed, etc. The preview image 601 can be automatically inserted into the frame 620, or the user can first touch and hold the frame 620 with their finger as shown in FIG. 6B, and then the controller 180 displays the inserted image 601 into the frame 620. The image 601 can also not be inserted into the frame 620 until the user performs a flicking operation, for example.

Figure 6C:
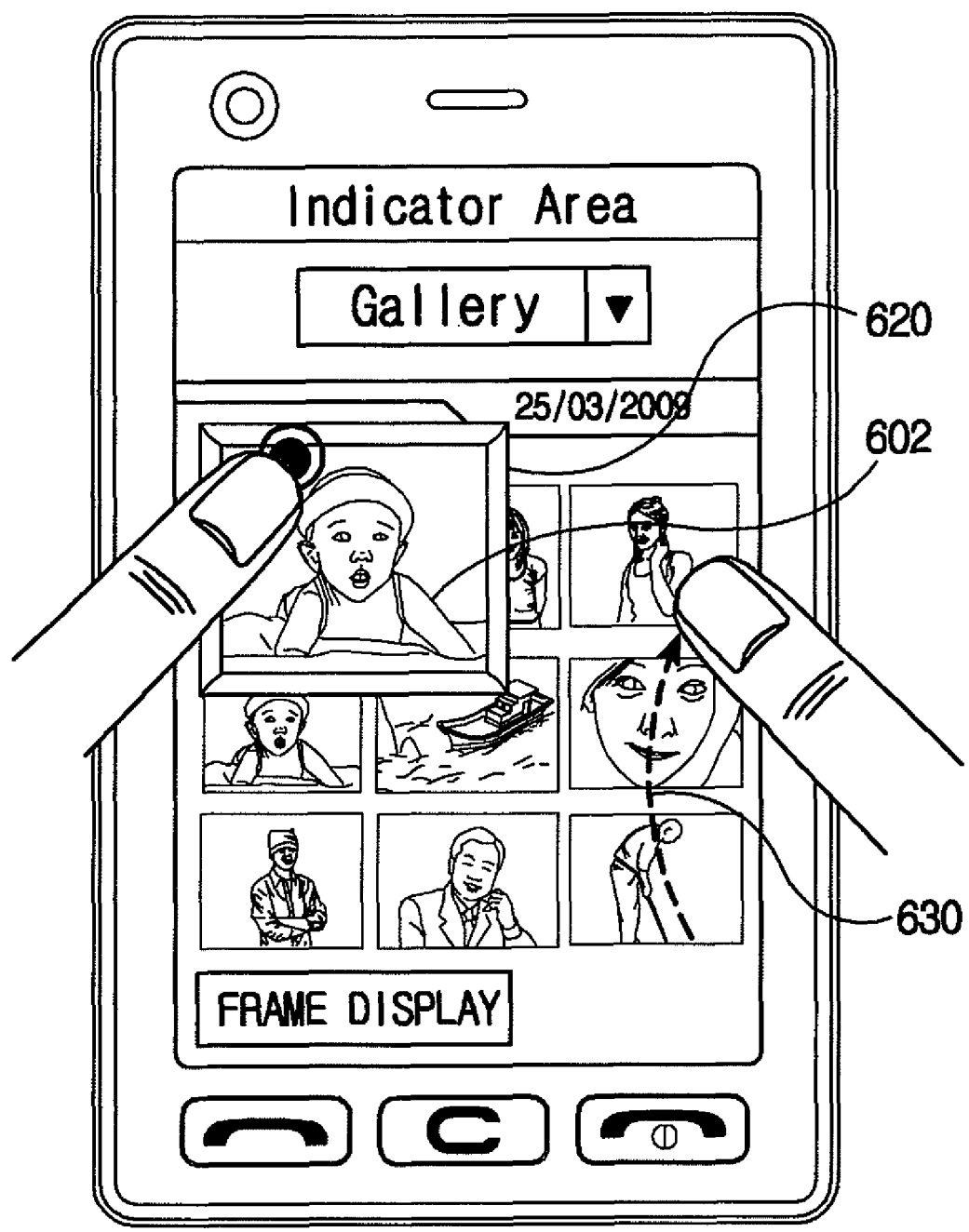

Then, as shown in FIG. 6C, the user can perform a flicking operation 630 with their second finger (e.g., the 'right finger') while maintaining the touch with the first pointing device (e.g., the 'left finger'). In this instance, the controller 180 inserts a next-priority image 602 into the frame 620 and displays the same on the touch screen 151. Also, the next-priority image may be set up by the user or set up as a default value. For example, the next-priority image may be set as an image positioned at the right hand side of the currently inserted image, an image underneath the currently inserted image, images that were most recently captured, etc. Alternatively, the next-priority item may be set by the direction of the flicking signal. Thus, the user may continuously generate the flicking signal to allow next-priority images 603, 604. etc. to be inserted into the frame 620 and displayed on the touch screen 151.

Figure 6D:
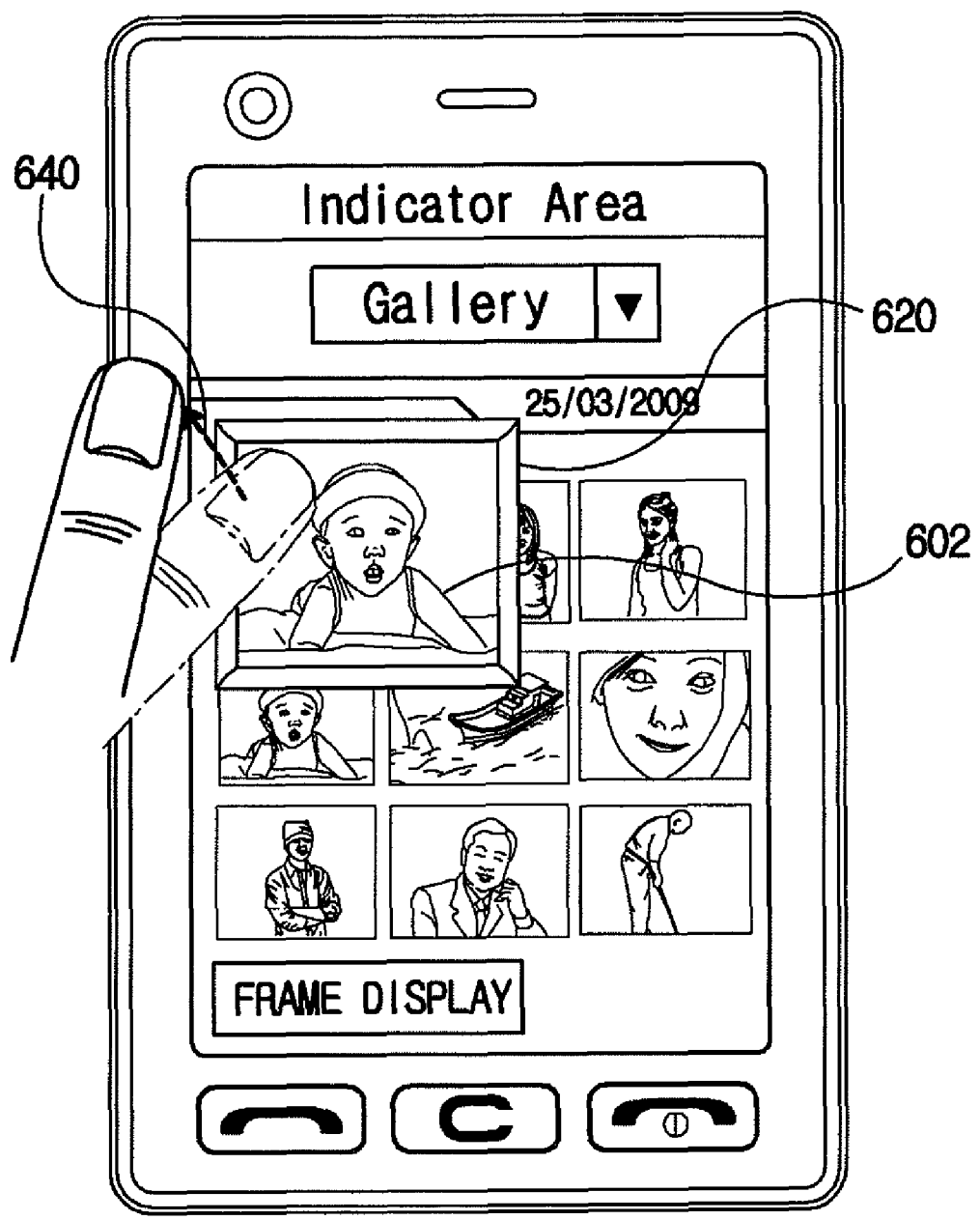

Then, as shown in FIG. 6D, the user can input a detail view screen (e.g., full screen) display signal 640 for viewing the displayed preview screen in more detail. Further, the user can generate the detail view screen display signal 640 by bringing the first pointing device (e.g., the 'left finger') off the touch screen as shown in FIG. 6D. However, the generation of the detail view screen display signal 640 is not limited thereto. For example, the user can generate the detail view screen display signal 640 by multiple-touching the second pointing device, or can generate the signal 640 by various other methods.

Figure 6E:
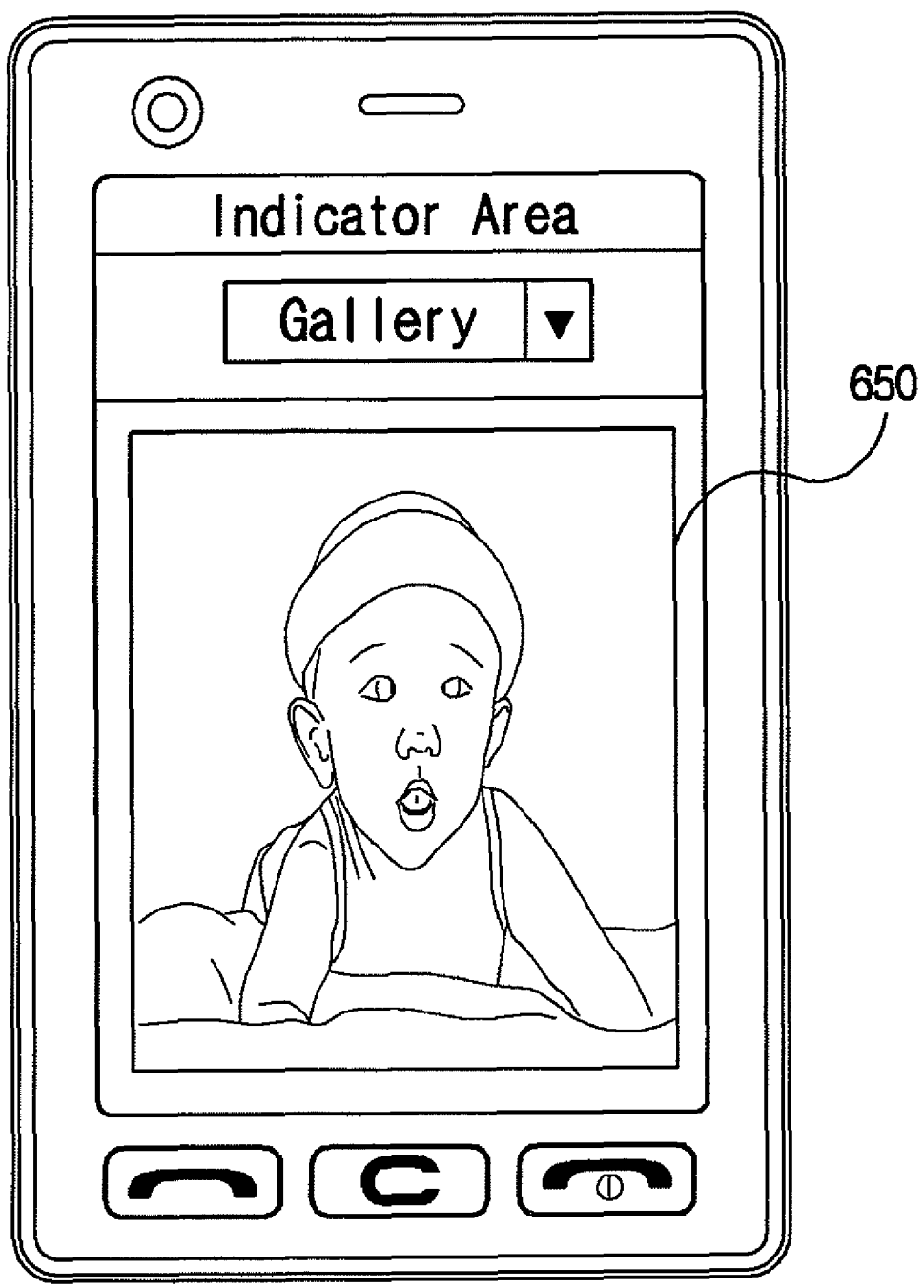

Then, when the detail view screen display signal 640 is input, the controller 180 changes the frame 620 and the image inserted into the frame as a full screen 650 as shown in FIG. 6E. Note that the controller 180 can also display the frame 620 in the full screen mode, which shows the image 602 to appear as it is framed. The controller 180 can also not display the frame 620 with the image 602. The user can also set whether or not they want the frame 620 displayed with a particular image in full screen mode by using the appropriate menu options on the mobile terminal 100.

As a modification to the third embodiment, the user can move an item selected from the plurality of items in the item list to a desired position. In more detail, the user can select an image using their left finger (first pointing device) to perform one of a long touch, a selection and a touch-and-hold to one of a plurality of images 601-603 (see FIG. 6A). The controller 180 can then highlight the selected image on the touch screen 151. The plurality of images 601-603 except for the selected image can then be moved or rotated by the flicking signal 630 in response to the moving direction of the second pointing device (the user's 'right finger') (see FIG. 6C). The signal for moving the plurality of images can also be generated using a scroll bar in response to the second pointing device.

Then, the user can input a selection release signal for moving the touched- and held image to between the plurality of images newly arranged on the touch screen 151 by the flicking signal. Further, the selection release signal, which can be generated in the same method as that of the detail view screen display signal 640, may also be generated through performance of an additional operation or by allowing the first pointing device to be (spaced apart) distanced from the touch screen 151. The performance of additional operation may be a long touch or a double touch to the selected image. Furthermore, the user may use the first pointing device to drag the selected item to an item list position to which the item is to be inserted, and generate the selection release signal through the performance of additional operation or by distancing the first pointing device from the touch screen 151.

The touch-and-held image by the selection release signal may be inserted into one of 'prior to the first item of the plurality of items', 'between the plurality of items', and 'posterior to the last item of the plurality of items'. Therefore, the user can conveniently insert the plurality of images into the frame, whereby the touched-and-held image can be conveniently moved to a desired position.

Thus, in this alternative embodiment, the method of controlling a mobile terminal includes displaying a plurality of items on a touch screen, selecting and highlighting a first item among the plurality of items upon receiving a selection signal generated by a first pointing device, moving and rearranging the plurality of items except for the first item upon receiving a predetermined rearranging signal generated by a second pointing device, and inserting the first item into a predetermined position among the rearranged plurality of items when a release signal is generated for the selected first item. Further, the selection signal includes at least one of a long touching operation, a single or double touch operation and a touch-and-hold operation on the first item, and wherein the release signal includes at least one of a flicking operation, a touch and drag operation, a scroll bar movement operation, a touch and drop operation, a proximity touch operation, etc.

Figure 7A:
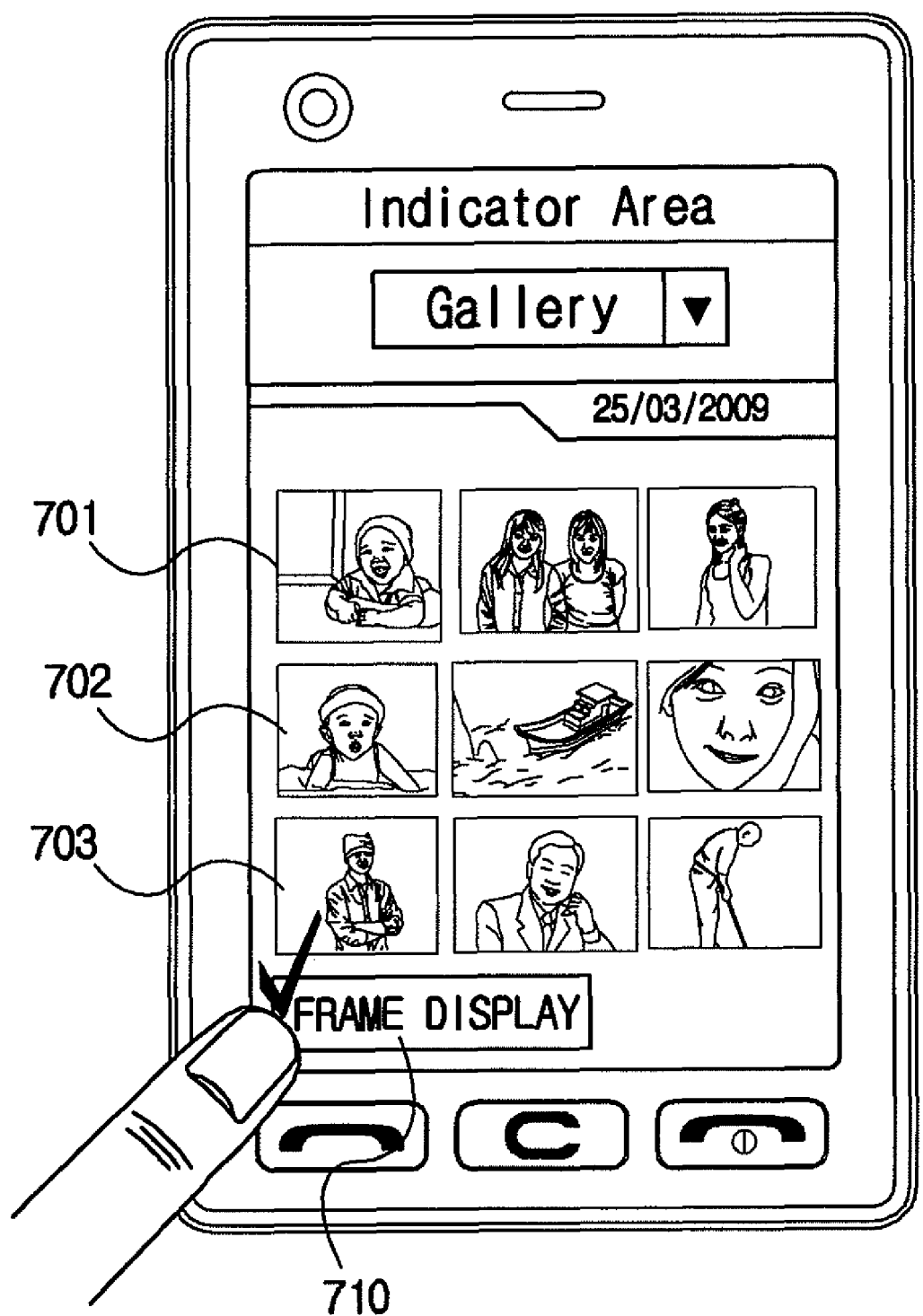
FIGS. 7A-7E are overviews of display screens illustrating a method for displaying data according to a fourth embodiment of the present invention.
Figure 7B:
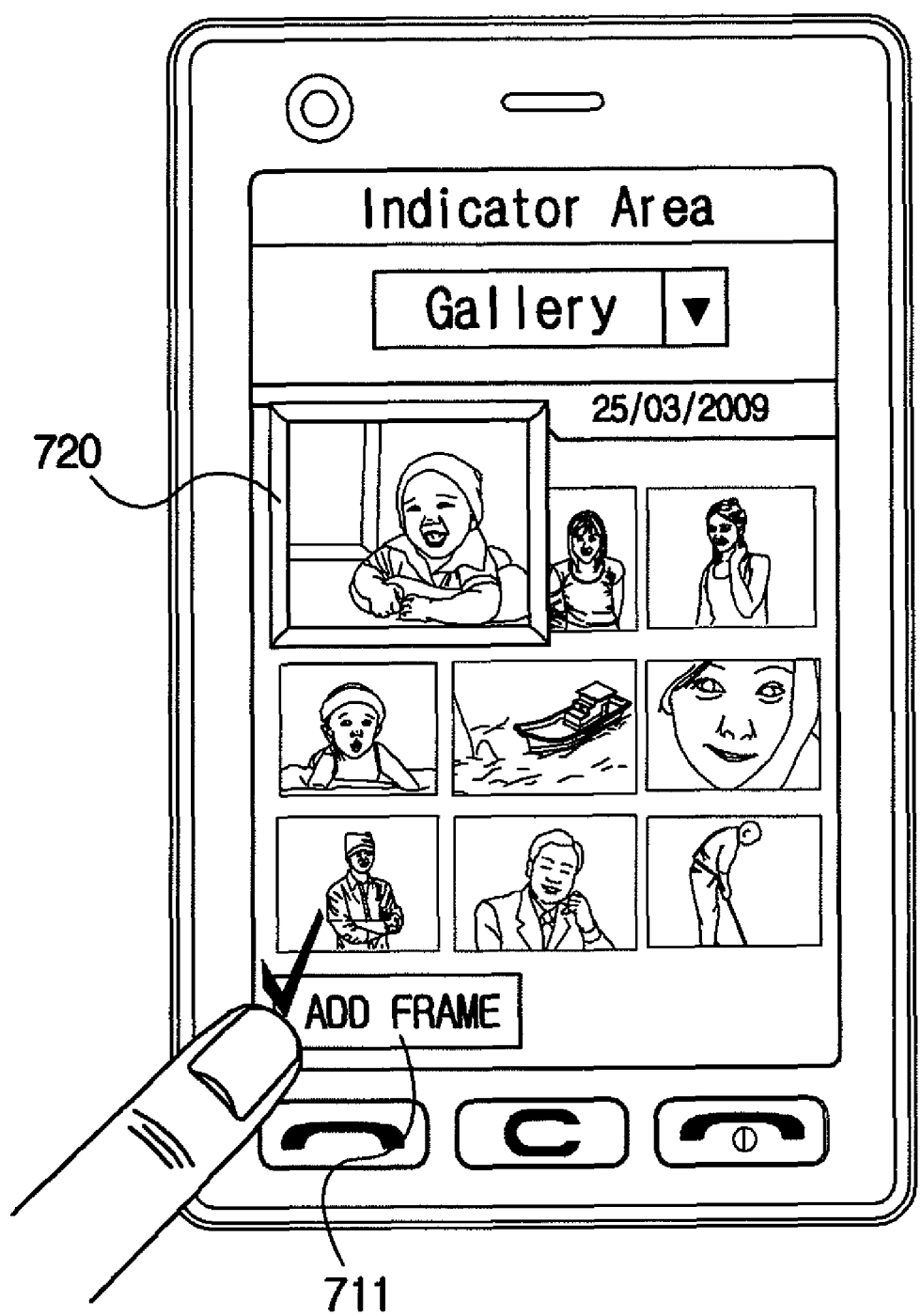
Figure 7C:
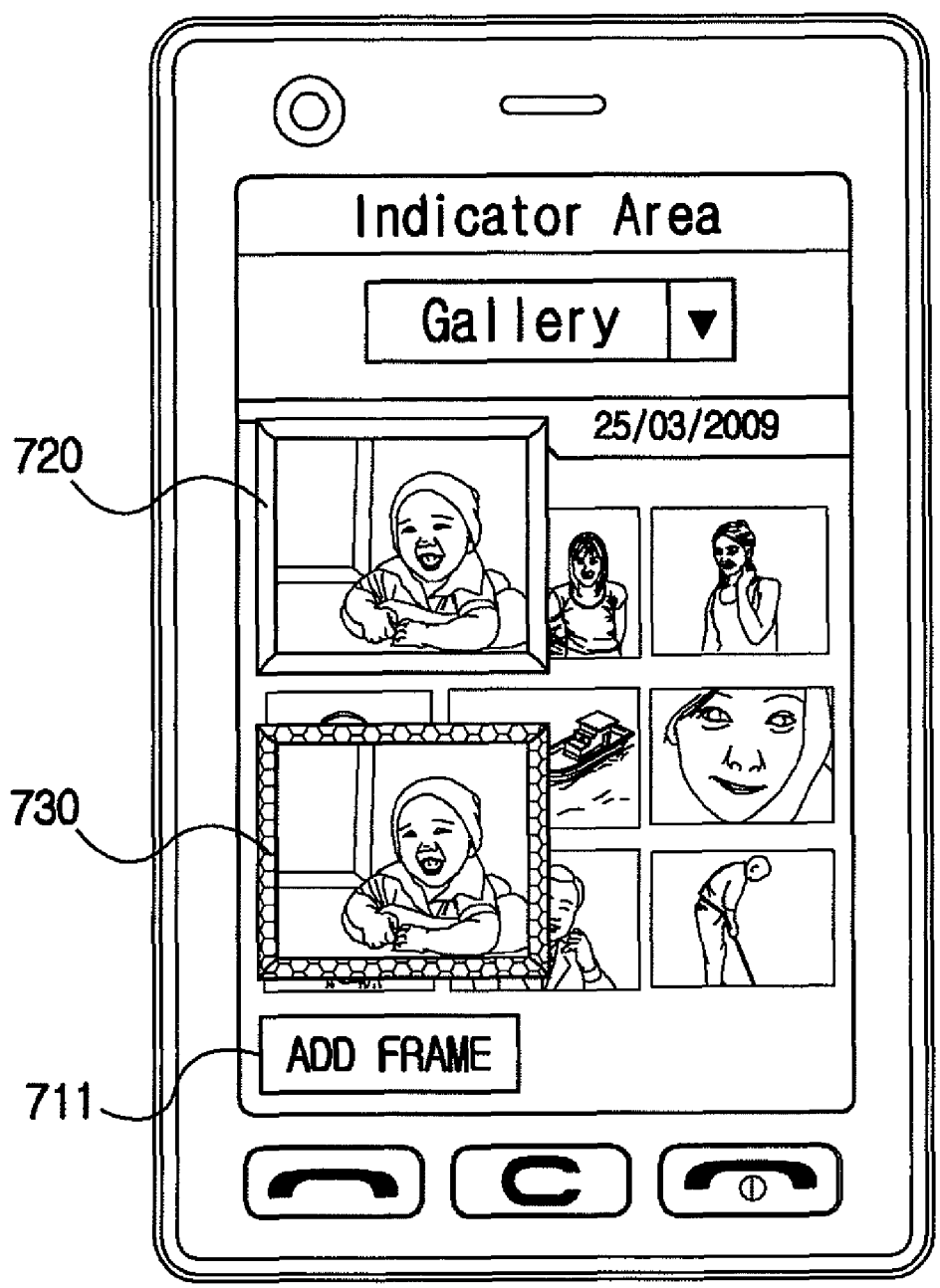

Next, FIGS. 7A-7E are overviews of display screens illustrating a method for displaying data according to a fourth embodiment of the present invention. In this embodiment, the controller 180 extracts a plurality of images 701-704 from the memory 160 and displays the images on the touch screen 151 in the form of thumbnails in response to a user's selection (see FIG. 7A). Then, when the user selects a frame display icon 710, the controller 180 displays a first frame 720 and an add frame icon 711 used for inserting the thumbnail image as shown in FIG. 7B. Further, as shown in FIGS. 7B and 7C, when the user selects the add frame icon 711, the controller 180 displays a second frame 730 on the touch screen 151. The same image in the first frame 720 is displayed in the second frame 730, but the frames 720 and 730 are different.

Figure 7D:
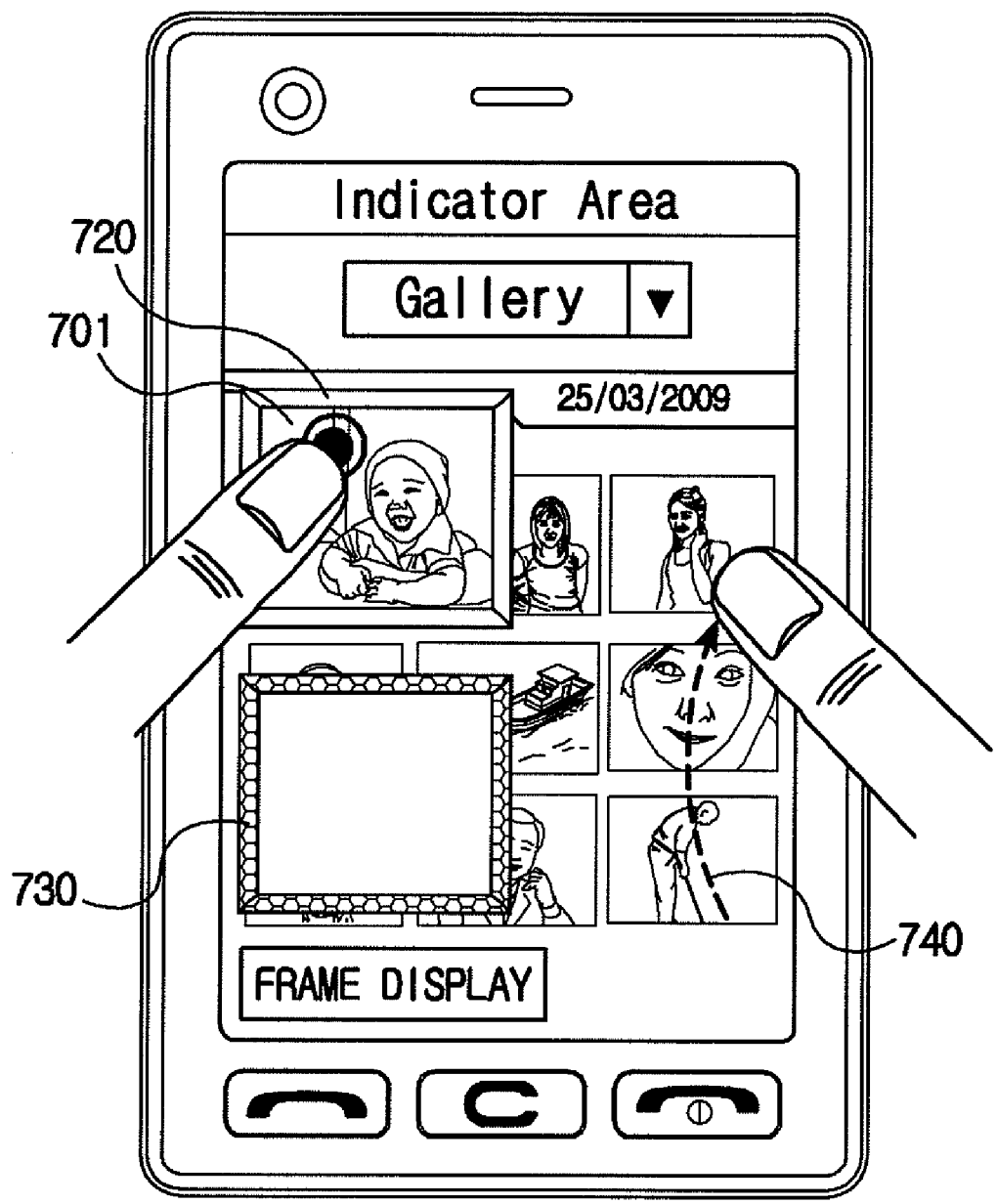
Figure 7E:
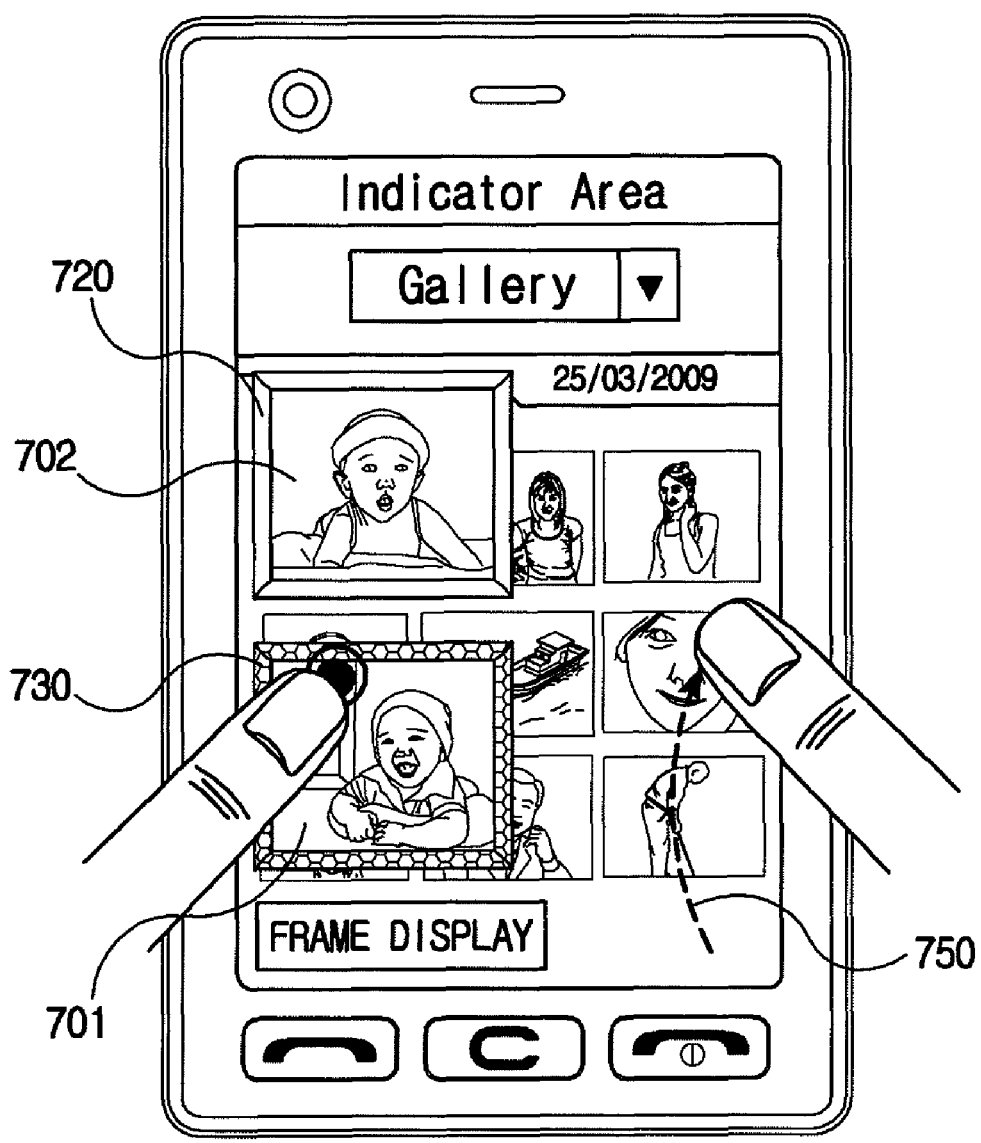

Then, as shown in FIG. 7D, the user can touch and hold the first frame 720 with their left finger (the first pointing device), and the controller 180 selects the first frame 720 with the image 701. The user can then use their right finger to generate a flicking signal while holding their left finger as shown in FIG. 7D. Based on the flicking signal, the controller 180 inserts a next-priority image 702 in the first frame 720 as shown in FIG. 7E. When the user uses their left finger to touch and hold the second frame 730, the controller 180 displays the second frame 730 including the image 701 previously displayed in the first frame 720 as shown in FIG. 7E.

The user can also use their right finger to generate a flicking signal while holding their left finger (see FIG. 7E), and then the controller 180 inserts a next-priority image 702 to the second frame 730. In addition, the user can continuously generate the flicking signal, whereby the controller 180 inserts the next-priority images 703, 704 into the first frame 720 or the second frame 730. The method of displaying the detail view screen is the same as that shown in FIG. 6E. Therefore, the user can display several frames and freely insert a plurality of images into the several frames.

Figure 8A:
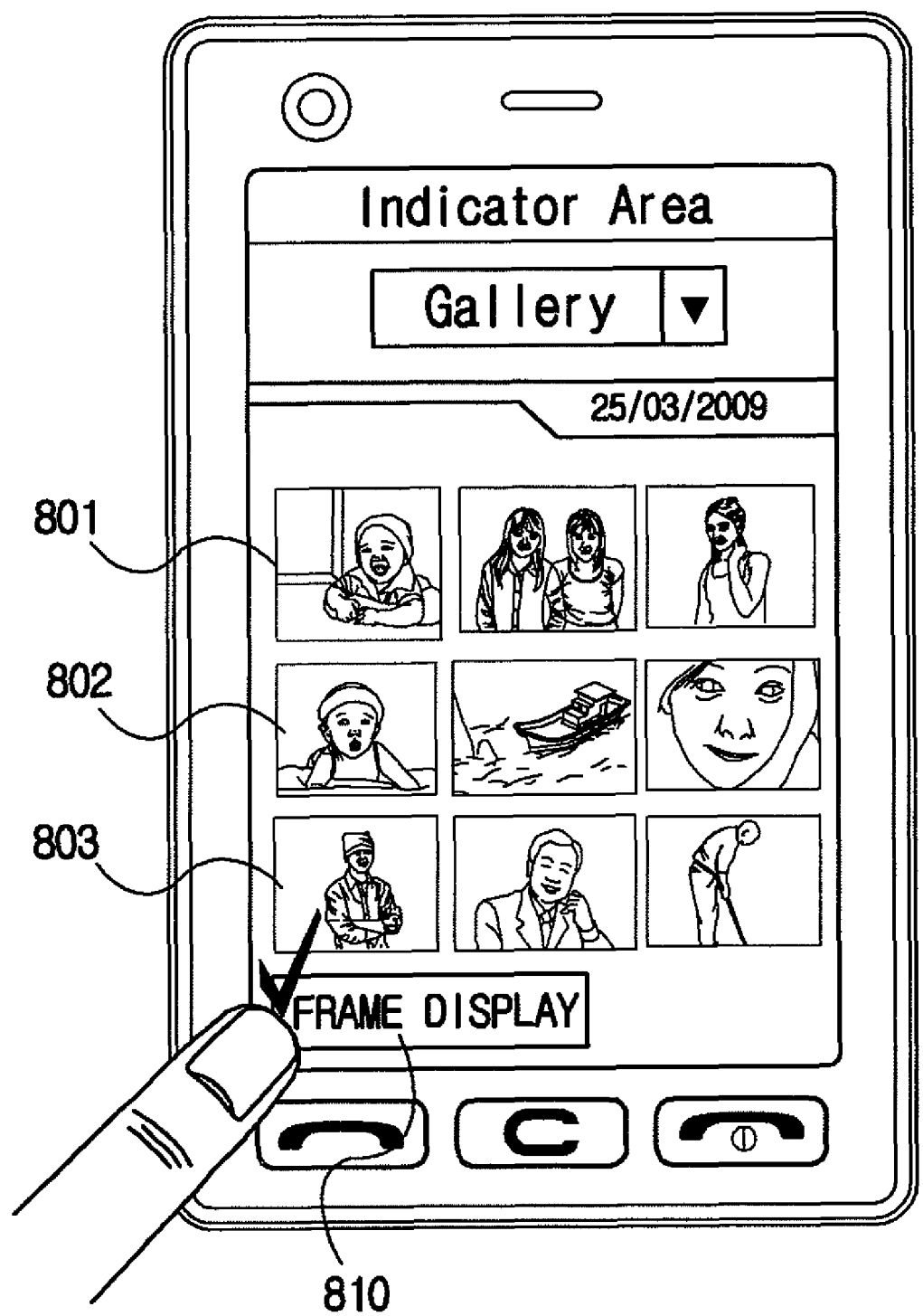
FIGS. 8A-8C are overviews of display screens illustrating a method for displaying data according to a fifth embodiment of the present invention.
Figure 8B:
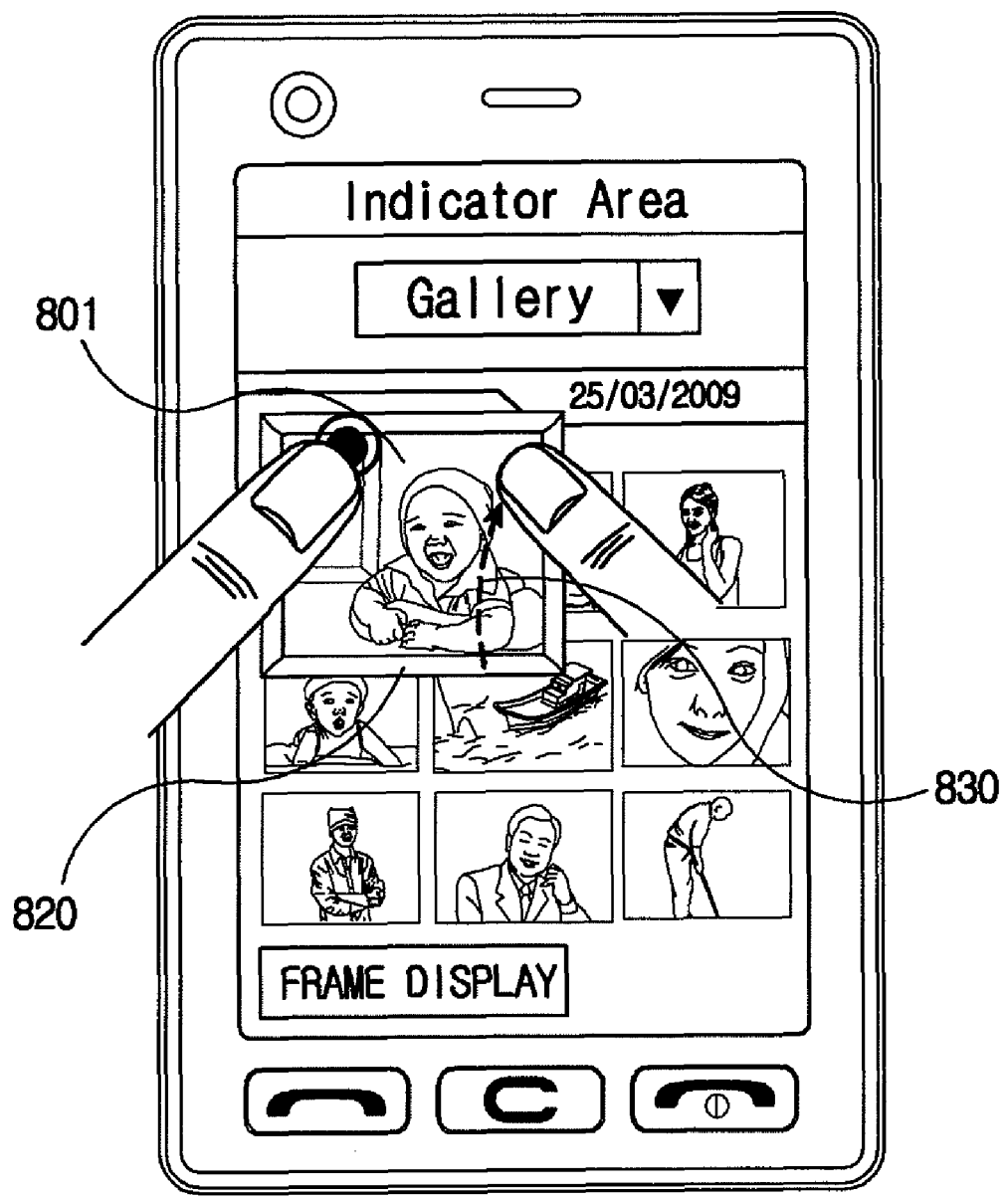
Figure 8C:
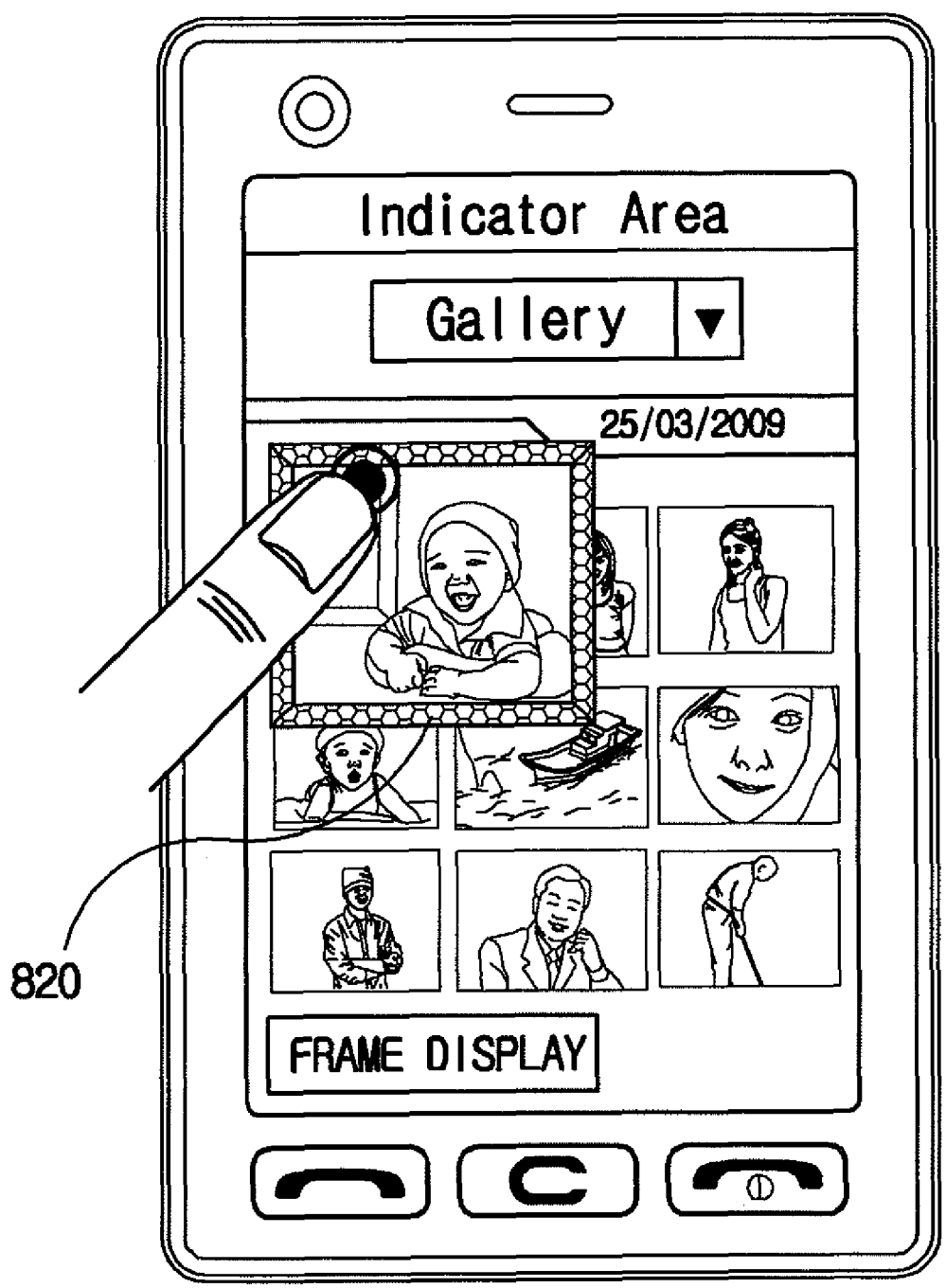

Next, FIGS. 8A-8C are overviews of display screens illustrating a method for displaying data according to a fifth embodiment of the present invention. In this embodiment, the controller 180 extract a plurality of images 801-804 from the memory 160 and displays the images on the touch screen 151 in the form of thumbnails in response to a user's selection (see FIG. 8A). Then, when the user selects a frame display icon 810, the controller 180 displays a frame 820 that can include an inserted thumbnail image (see FIG. 8B).

Then, when the user uses their left finger to touch and hold the frame 820, the controller 180 displays a preview screen including the frame 820 with the thumbnail image 801 inserted into the frame 820 (see FIG. 8B). As shown in FIGS. 8B and 8C, the user can then use their right finger to generate a flicking signal 830 while holding their left finger. In this instance, the controller 180 then changes the shape, color, pattern, size, etc. of the frame 820. As a result, the user can conveniently change the shape of the frame.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include Internet transmission, etc The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for controlling a mobile terminal, the method comprising:

displaying, via a display, a plurality of items on a touch screen of the mobile terminal;

receiving, via a controller on the mobile terminal, a first touching signal indicating a first item of the plurality of items has been touched and held for a predetermined amount of time;

displaying, via the display, a first preview screen corresponding to the selected first item when the first item has been touched and held for the predetermined amount of time;

receiving, via the controller, a second touching signal indicating a flicking operation has been performed on the touch screen while the first touching signal is still being received; and displaying, via the display, a second preview screen of a next-priority item among the plurality of items instead of the first preview screen based on the received first and second touching signals.

2. The method of claim 1, further comprising:
receiving, via the controller, a full screen mode selection signal while a corresponding one of the first and second preview screens is being displayed; and
displaying, via the display, contents corresponding to the displayed first or second preview screens in the full screen mode when receiving the full screen mode selection signal.

3. The method of claim 1, wherein the plurality of items include a plurality of messages, the first item corresponds to a first message of the plurality of messages, and the next-priority item corresponds to a second message having a next priority level compared to the first message among the plurality of messages.

4. The method of claim 3, wherein the displaying the first preview screen comprises displaying contents of the first message in a preview window, and
wherein the displaying the second preview screen comprises displaying contents of the second message in the preview window instead of the first message.

5. The method of claim 1, further comprising:
receiving, via the controller, a biographical list display signal while the first or second preview screens are being displayed;
displaying, via the display, a biographical list extracted from a memory of the mobile terminal upon receiving the biographical list display signal; and
transmitting, via a wireless communication unit included on the mobile terminal, contents included within the first preview screen or second preview screens currently being displayed to at least one other mobile terminal corresponding to a selected biographical item.

6. The method of claim 1, wherein the plurality of items include a plurality of thumbnail images, the first item corresponds to a first thumbnail image of the plurality of thumbnail images, and the next-priority item corresponds to a second thumbnail image having a next priority level compared to the first thumbnail image among the plurality of thumbnail images.

7. The method of claim 6, further comprising:
receiving, via the controller, a frame selection signal; and
displaying, via the display, a first frame configured to receive the first thumbnail image.

8. The method of claim 7, wherein the first touching signal corresponds to touching and holding the first frame,
wherein the displaying the first preview screen corresponds to displaying the first thumbnail image in the first frame, and
wherein the displaying the second preview screen includes displaying the second thumbnail image in the first frame based on the received first and second touching signals.

9. The method of claim 1, wherein the first and second touching signal correspond to one of touching with a user's finger, touching with a stylus and proximity touching with the user's finger or the stylus.

10. A mobile terminal, comprising:
a wireless communication unit configured to wirelessly communicate with at least one other terminal;
a display configured to display a plurality of items on a touch screen of the mobile terminal; and
a controller configured to receive a first touching signal indicating a first item of the plurality of items has been touched and held for a predetermined amount of time, wherein the controller is further configured to control the display to display a first preview screen corresponding to the selected first item when the first item has been touched and held for the predetermined amount of time, to receive a second touching signal indicating a flicking operation has been performed on the touch screen while the first touching signal is still being received, and to control the display to display a second preview screen of a next-priority item among the plurality of items instead of the first preview screen based on the received first and second touching signals.

11. The mobile terminal of claim 10, wherein the controller is further configured to receive a full screen mode selection signal while a corresponding one of the first and second preview screens is being displayed, and to control the display to display contents corresponding to the displayed first or second preview screens in the full screen mode when receiving the full screen mode selection signal.

12. The mobile terminal of claim 10, wherein the plurality of items include a plurality of messages, the first item corresponds to a first message of the plurality of messages, and the next-priority item corresponds to a second message having a next priority level compared to the first message among the plurality of messages.

13. The mobile terminal of claim 12, wherein the controller is further configured to display the first preview screen by displaying contents of the first message in a preview window, and display the second preview screen by displaying contents of the second message in the preview window instead of the first message.

14. The mobile terminal of claim 10, wherein the controller is further configured to receive a biographical list display signal while the first or second preview screens are being displayed, to control the display to display a biographical list extracted from a memory of the mobile terminal upon receiving the biographical list display signal, and to control the wireless communication unit to transmit contents included within the first preview screen or second preview screen currently being displayed to at least one other mobile terminal corresponding to a selected biographical item.

15. The mobile terminal of claim 10, wherein the plurality of items include a plurality of thumbnail images, the first item corresponds to a first thumbnail image of the plurality of thumbnail images, and the next-priority item corresponds to a second thumbnail image having a next priority level compared to the first thumbnail image among the plurality of thumbnail images.

16. The mobile terminal of claim 15, wherein the controller is further configured to receive a frame selection signal, and to control the display to display a first frame configured to receive the first thumbnail image.

17. The mobile terminal of claim 16, wherein the first touching signal corresponds to touching and holding the first frame, and
wherein the controller controlling the display to display the first preview screen corresponds to displaying the first thumbnail image in the first frame, and displaying the second preview screen corresponds to displaying the second thumbnail image in the first frame based on the received first and second touching signals.

18. The mobile terminal of claim 10, wherein the first and second touching signal correspond to one of touching with a user's finger, touching with a stylus and proximity touching with the user's finger or the stylus.

* * * * *